United States Patent
Li (10) Patent No.: US 11,237,383 B2
(45) Date of Patent: Feb. 1, 2022

(54) DIMMING PANEL AND DRIVING METHOD, PREPARATION METHOD THEREOF, CONTROLLING DEVICE AND CONTROLLING SYSTEM

(71) Applicants: Beijing BOE Technology Development Co., Ltd., Beijing (CN); BOE TECHNOLOGY GROUP CO., LTD., Beijing (CN)

(72) Inventor: Wenbo Li, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 197 days.

(21) Appl. No.: 16/397,625

(22) Filed: Apr. 29, 2019

(65) Prior Publication Data
US 2020/0073112 A1  Mar. 5, 2020

(30) Foreign Application Priority Data

Sep. 4, 2018 (CN) .......................... 201811024606.3

(51) Int. Cl.
*G02B 26/02* (2006.01)

(52) U.S. Cl.
CPC .................. *G02B 26/023* (2013.01)

(58) Field of Classification Search
CPC ...... G02B 26/023; G02B 26/02; G02B 5/005; G02B 5/205; G02B 26/007; G02B 27/281; G02B 5/003; G02B 7/006; G02B 26/008; G02B 26/0833; G02B 5/201; G02B 5/208; G02B 2027/0118; G02B 21/06; G02B 26/04; G02B 27/0018; G02B 5/20; G02B 26/00; G02B 5/26; G02B 7/02; H04N 5/2254; H04N 5/2353; H04N 5/238; H04N 5/33; H04N 5/2256; H04N 5/2257; H04N 5/2253; H04N 5/2259; H04N 5/23212;
(Continued)

(56) References Cited

U.S. PATENT DOCUMENTS

| 7,110,163 | B2 * | 9/2006 | Webber ................ G02F 1/1675 359/296 |
| 2007/0091038 | A1 * | 4/2007 | Hagood, IV ........... G02B 26/02 345/85 |

(Continued)

FOREIGN PATENT DOCUMENTS

WO    WO-2016049759 A1 *  4/2016  ........... G02B 26/023

*Primary Examiner* — William R Alexander
*Assistant Examiner* — Sharrief I Broome
(74) *Attorney, Agent, or Firm* — Thomas | Horstemeyer, LLP (57) ABSTRACT

This disclosure describes a dimming panel and its driving method, a preparation method and a controlling device, and a controlling system. The dimming panel includes a substrate, a first transparent electrode layer and an insulating layer sequentially disposed on the substrate, and a curled structure disposed on the insulating layer. The curled structure includes a second transparent electrode layer that has a preset inherent force for curling. The second flexible electrode layer is configured to absorb or reflect light. The first transparent electrode layer and the insulating layer have groove structures that are formed corresponding to each other. The curled structure can be disposed within the groove structure.

19 Claims, 4 Drawing Sheets

(58) Field of Classification Search
CPC ........... H04N 5/23229; H04N 5/23245; H04N 5/2351; H04N 5/247; H04N 9/3155; H04N 13/32; H04N 13/344; H04N 13/395; H04N 13/398; H04N 5/06; H04N 5/225; G03B 11/00; G03B 9/02; G03B 9/10; G03B 17/12; G03B 21/2053; G03B 2205/0069; G03B 3/10; G03B 5/00; G03B 11/045; G03B 17/02; G03B 21/00; G03B 21/142; G03B 21/20; G03B 21/2073; G03B 33/08; G03B 9/06; G03B 9/08; G03B 9/22; G03B 15/00; G03B 21/001; B81B 2201/045; B81B 2203/0118; B81B 3/0037; B81B 2201/032; B81B 2203/0315; B81B 2203/0384; B81B 2203/051; B81B 3/0024; B81B 3/0051; B81B 2201/047; B81B 2203/055; B81B 3/0035; B81B 3/0043; B81B 3/0072; B81B 3/0083; G03F 7/7055; G03F 7/70033; G03F 7/70191; G03F 7/70558; G03F 7/70008; G03F 7/70158; G03F 7/7085; G03F 7/20; G03F 7/70025; G03F 7/70108; G03F 7/70141; G03F 7/70483; G03F 7/70525; G03F 7/70616; G03F 7/70625; G03F 9/7065; G03F 9/7069; A61B 3/0008; A61B 3/0025; A61B 3/0058; A61B 3/1005; A61B 3/101; A61B 3/107; A61B 3/14; A61B 1/043; A61B 1/0646; A61B 1/00; A61B 1/00186; A61B 1/045; A61B 1/05; A61B 1/06; A61B 1/0661; A61B 1/07; G01J 1/0407; G01J 1/0418; G01J 1/26; G01J 1/429; G01J 1/0414; G01J 1/42; G01J 1/4257; G01J 2001/0285; G01J 2003/1213; G01J 3/0202; G01J 3/0205; G01J 3/0213; G01J 3/0235; G01J 3/0267; G01J 3/027; G01J 3/0289; G01J 3/0291; G01J 3/2823; G01J 3/51; G09G 2320/0626; G09G 3/2003; G09G 3/32; G09G 3/3433; G09G 2300/023; G09G 2310/08; G09G 2340/14; G09G 3/001; G09G 3/003; G09G 3/025; G09G 3/3406; G09G 3/3413; G09G 3/344; G09G 2300/0426; G09G 2300/0452; G09G 2300/0465; G09G 2310/0235; G09G 2310/068; G09G 2320/0233; G09G 2320/045; H01L 27/1225; H01L 27/3244; H01L 27/3276; H01L 21/326; H01L 21/477; H01L 21/681; H01L 2223/54426; H01L 2223/5446; H01L 23/544; H01L 27/1218; H01L 27/124; H01L 27/1244; H01L 27/1248; H01L 27/1259; H01L 27/1262; H01L 27/127; H01L 27/14609; H01L 27/307; H01L 27/3241; H01L 27/3272; G01N 2021/6471; G01N 21/6458; G01N 17/002; G01N 17/004; G01N 2021/4704; G01N 2021/4735; G01N 2021/6463; G01N 21/255; G01N 21/4795; G01N 21/59; G01N 21/5907; G01N 21/64; G01N 21/645; G01N 21/8483; G01N 21/8806; G01N 21/9501; G01N 21/954; G01N 2201/022; G01N 2201/025; G01N 2201/0612; G02F 1/133305; G02F 1/136286; G02F 1/167; G02F 1/1681; G02F 1/17; G02F 2203/48; G02F 1/0063; G02F 1/0126; G02F 1/0147; G02F 1/1323; G02F 1/133302; G02F 1/1335; G02F 1/133509; G02F 1/133514; G02F 1/133528; G02F 1/133553; G02F 1/1336; G02F 1/134309; G02F 1/134336; G02F 1/1345

See application file for complete search history.

(56) References Cited

U.S. PATENT DOCUMENTS

| | | | | |
|---|---|---|---|---|
| 2008/0259253 | A1* | 10/2008 | Broer | G02B 26/02 349/86 |
| 2010/0001666 | A1* | 1/2010 | Johnson | G02B 26/02 318/116 |
| 2014/0118388 | A1* | 5/2014 | Buckley | G09G 3/3433 345/593 |
| 2016/0133677 | A1* | 5/2016 | Yamamoto | H01L 27/3246 257/40 |

* cited by examiner

DIMMING PANEL AND DRIVING METHOD, PREPARATION METHOD THEREOF, CONTROLLING DEVICE AND CONTROLLING SYSTEM

CROSS REFERENCE TO RELATED APPLICATIONS

This application is based upon and claims priority to Chinese Patent Application No. 201811024606.3, filed on Sep. 4, 2018, where the entire contents thereof are incorporated herein by reference.

TECHNICAL FIELD

This disclosure relates to a technical field associated with electronically controlled dimming, in particular, to a dimming panel, a driving method, a preparation method thereof, a regulating device, and a regulating system.

BACKGROUND

Electronically controlled intelligent dimming glasses have been in the domestic market since 2003. Due to its high price and only being known by a few people, the electronically controlled intelligent dimming glasses had slow development in China during the past decade. In recent years, with increasingly rapid growth of the national economy, the domestic building material market has developed rapidly, such that the electronically controlled intelligent dimming glass has gradually been accepted in construction and design industries and has started to be applied, mainly in the construction and transportation fields. The technologies used in the intelligent glasses mainly include liquid crystal, electrochromism, photochromism, thermochromism, etc., where electrochromism has been used in windows of an aircraft.

However, the curling design of the dimming glass at the present results in forming protrusions on an insulating dielectric layer, which may result in damage or obscuration of a curled portion due to accidental external friction or other forces, such that serious results may be caused.

SUMMARY

As the first aspect, a dimming panel, as provided in an implementation of the present disclosure, includes a substrate, a first transparent electrode layer, an insulating layer sequentially disposed on the substrate, and a curled structure disposed on the insulating layer. The curled structure includes a second transparent electrode layer and has a preset inherent force for curling. The curled structure is configured to absorb or reflect light in an unfolded state. The first transparent electrode layer and the insulating layer have groove structures that are formed corresponding to each other. The curled structure is disposed within the groove structure.

In some optional implementations, a receiving groove is formed on the substrate, and the first transparent electrode layer and the insulating layer have the groove structure formed on the receiving groove.

In some optional implementations, a liner layer is disposed on the substrate, and the receiving groove is formed on the liner layer, the first transparent electrode layer and the insulating layer are sequentially disposed on the liner layer, and have the groove structure formed on the receiving groove.

In some optional implementations, the groove structure is an inverted trapezoid, and a depth of the groove structure is greater than or equal to a curling height of the curled structure in a curled state.

In some optional implementations, a first contact electrode is disposed in the groove structure. One end of the second flexible electrode layer is fixedly connected to the insulating layer through the first contact electrode, and the first contact electrode is used for supplying power for the second flexible electrode layer.

In some optional implementations, a second contact electrode is disposed on one end of the first transparent electrode layer close to the groove structure, and the second contact electrode is used for supplying power for the first transparent electrode layer.

In some optional implementations, a third contact electrode is disposed on one end of the insulating layer away from the groove structure, and the third contact electrode is used as a positioning structure for the second flexible electrode layer when being unfolded.

In some optional implementations, a bevel structure is disposed on one side of the third contact electrode corresponding to the groove structure.

In some optional implementations, a terminal structure matched with the third contact electrode is disposed on one end of the second flexible electrode layer corresponding to the third contact electrode.

In some optional implementations, the curled structure further includes a polymer layer, the second flexible electrode layer is arranged to attach to the polymer layer, and at least one of the second flexible electrode layer and the polymer layer has a preset inherent stress for curling.

In some optional implementations, the polymer layer is disposed on one side of the second flexible electrode layer away from the first transparent electrode layer.

In some optional implementations, the first transparent electrode layer includes a plurality of strip electrodes that are arranged separately, and an arrangement direction of the plurality of strip electrodes is the same as a stretching direction of the second flexibility electrode layer.

As the second aspect, an implementation of the present disclosure further provides a controlling device, which includes the dimming panel according to the implementation of the present disclosure.

As the third aspect, an implementation of the present disclosure further provides a controlling system, which includes the dimming panel or the controlling device according to the implementation of the present disclosure, and the controlling system further includes a power supply for supplying power and a control unit for controlling stretching or curling of the second flexible electrode layer.

As the fourth aspect, an implementation of the present disclosure further provides a driving method of the dimming panel according to the implementation of the present disclosure. The driving method includes stretching driving and curling driving.

The stretching driving includes:

at a first stage in which the second flexible electrode layer is located within the groove structure, a preset reference voltage is input to the first transparent electrode layer, and a preset climbing voltage is input to the second flexible electrode layer, and the climbing voltage is used for driving the second flexible electrode layer to stretch out of the groove structure;

at a second stage in which the second flexible electrode layer is at least partially separated from the groove structure, a preset stretching voltage is input to the second flexible electrode layer, and the stretching voltage is used for driving the second flexible electrode layer to stretch in a direction close to the first transparent electrode layer, where the stretching voltage is less than the climbing voltage;

or, at the first stage in which the second flexible electrode layer is located within the groove structure, a preset reference voltage is input to the second flexible electrode layer, and a preset climbing voltage is input to the first transparent electrode layer, and the climbing voltage is used for driving the second flexible electrode layer to stretch out of the groove structure;

at the second stage in which the second flexible electrode layer is at least partially separated from the groove structure, a preset stretching voltage is input to the first transparent electrode layer, and the stretching voltage is used for driving the second flexible electrode layer stretch in a direction close to the first transparent electrode layer, where the stretching voltage is less than the climbing voltage;

The curling driving includes:

cancelling voltage of at least one of the first transparent electrode layer and the second flexible electrode layer such that the second flexible electrode layer is re-curled into the groove structure under the action of inherent stress.

In some optional implementations, the driving method further includes:

at a third stage in which the second flexible electrode layer is fully stretched, a preset maintaining voltage is input to the second flexible electrode layer or the first transparent electrode layer, and the maintaining voltage is used for driving the second flexible electrode layer to resist against the inherent stress to maintain the unfolded state, where the maintaining voltage is less than the stretching voltage.

As the fifth aspect, an implementation of the present disclosure further provides a driving method of the dimming panel. The driving method includes inputting a control voltage to the corresponding strip electrode according to the position where the second flexible electrode layer is stretched or changing a magnitude of the control voltage input to the corresponding strip electrode during the control voltage is input to the first transparent electrode layer;

wherein the plurality of strip electrodes that are arranged separately are separate driving electrodes; and the control voltage corresponds to the voltage applied in the second flexible electrode layer to form a reaction force against the inherent stress of the second flexible electrode layer.

As the sixth aspect, an implementation of the present disclosure further provides a preparation method of the dimming panel according to the implementation of the present disclosure, wherein the preparation method includes:

forming a first transparent electrode layer and an insulating layer on the substrate in sequence and forming a groove structure is correspondingly formed on the first transparent electrode layer and the insulating layer; and providing the curled structure including the second flexible electrode layer in the groove structure, wherein the curled structure has a preset inherent stress for curling.

DETAILED DESCRIPTION

To make the object, the technical solution, and advantages of the present disclosure more clear, the present disclosure will be further described in detail below with reference to the specific implementations and the drawings.

It should be noted that all expressions using "first" and "second" in the implementations of the present disclosure are used to distinguish different entities or different parameters with the same name, so the "first" and the "second" are presented only for the convenience of description. Usage of these terms should not be construed as limiting the implementations of the present disclosure, which will not be further interpreted in the following text.

Figure 1:
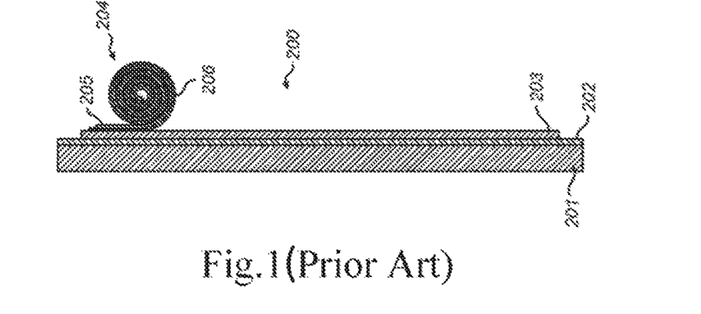
FIG. 1 is a schematic structural view of an electronically controlled dimming in the prior art.

Directed to alleviating harmful problems caused by the protrusion based on the curled portion in the electronically controlled dimming device at present, the present disclosure proposes an improved structural design to overcome the existing problems, and ensure effective implementation of dimming. Referring to FIG. 1, a schematic structural view of an electronically controlled dimming in the prior art is shown. As can be seen from FIG. 1, a dimming structure 200 in the electronically controlled dimming glass in the prior art generally includes a substrate 201, a first electrode layer 202, an insulating dielectric layer 203, and a film winding curtain 204 (including a flexible optical functional layer 205 and a second electrode layer 206) that is configured in a natural winding manner because of an elastic force caused by inherent stress. The stress of winding may be respectively derived from different thermal expansion coefficients of the materials of the flexible optical functional layer 205 and the second electrode layer 206, or may be caused by a manufacturing method, for example a layer deposition. The curled portion made in such manner has a protrusion formed on the insulating dielectric layer 203, which is likely to cause damage or obscuration of the curled portion due to accidental external friction or other forces, which can lead to seriously harmful results in the entire device.

As a result of this, the inventor, after careful analysis and verification, proposed an improved solution as described in the following implementations:

The First Implementation

The present disclosure provides a design with a novel electrode structure to form an electronically controlled dimming panel. Specifically, the dimming panel includes a substrate, a first transparent electrode layer and an insulating layer sequentially disposed on the substrate, and a curled structure disposed on the insulating layer. The curled structure includes a second flexible electrode layer and has a preset inherent stress of curling. The curled structure is used for absorbing or reflecting light in an unfolded state. The first transparent electrode layer and the insulating layer are provided with groove structures that are formed corresponding to each other. The curled structure is disposed within the groove structure. The curled structure has a function of absorbing or reflecting light in such a manner that light shading or transmitting of the dimming panel can be achieved by expanding or curling of the curled structure. Specifically, the curled structure may be provided with a material layer or a coating film layer for absorbing or reflecting light on the corresponding side according to the light shading requirements in different directions, or with a material layer or coating film layer for absorbing or reflecting light simultaneously on both sides. It should be noted that the material layer or the coating film layer for absorbing or reflecting light may be a layer different from the second flexible electrode layer in the curled structure, and also a layer capable of absorbing or reflecting light added into the second flexible electrode layer, which is not limited to the implementation of the present disclosure. In this regard, by providing an appropriate groove structure on the first transparent electrode layer and the insulating layer on the lower layer, a height of the curled structure that protrudes to the insulating layer is reduced, and even can be flushed with that of the insulating layer, that is, the curled structure when being curled only has a small part of the portion protruding to the insulating layer, and even not protruding to the insulating layer, thereby reducing or even avoiding obscuration or damage of the curled portion due to external friction or other forces occurring during or after the manufacturing process. The dimming panel according to the present disclosure can effectively reduce or even avoid damage or obscuration caused by the protrusion based on the curled portion, and ensure controlling accuracy and effectiveness.

Optionally, the corresponding same position refers to the first transparent electrode layer and the insulating layer each having a groove structure on an up-to-down aligned position perpendicular to the surface of the layer. For example, a first transparent electrode layer and the insulating layer are a mutually-parallel and uniformly disposed two-layer structure. In the same up-to-down aligned position, the first transparent electrode layer and the insulating layer are simultaneously recessed downward to form a groove structure.

Figure 2:
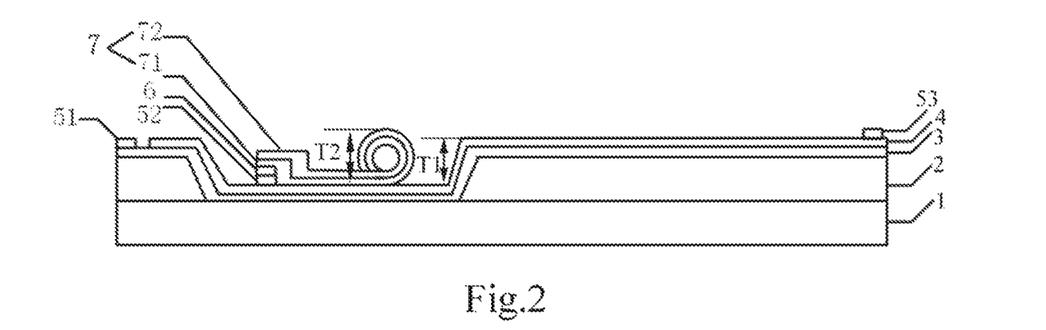
FIG. 2 is a schematic structural view of one implementation of a dimming panel as provided in the present disclosure.

Referring to FIG. 2, a schematic structural view of one implementation of a dimming panel as provided in the present disclosure is shown. As shown in FIG. 2, the dimming panel includes a substrate 1, a first transparent electrode layer 3 and an insulating layer 4 sequentially disposed on the substrate 1, and a curled structure 7 disposed on the insulating layer 4. The curled structure 7 includes a second flexible electrode layer 71 and has a preset inherent stress of curling such that the curled structure 7 can be curled up in a natural state, which does not play any shielding function to light transmission of the first transparent electrode layer 3 and the insulating layer 4. The inherent stress may be derived from different thermal expansion coefficients of the materials of the second flexible electrode layer 71 and the other layers in the curled structure 7, or may be produced by the manufacturing method of respective layers (for example, layer deposition method). At the same time, a local height of the curled structure after being curled on the basis of the prior art will far exceed the height of the curled structure when expanded to form a protrusion. As a result, a problem exists where damage is caused by the external factors as presented in the protrusion in the prior art. Thereby, this implementation provides, as shown in FIG. 3d, a groove structure 41 that is correspondingly formed on the first transparent electrode layer 3 and the insulating layer 4.

A part, or even all, of the curled structure 7 is disposed within the groove structure 41 such that, in this fashion, the curled structure will not be damaged easily by a larger protrusion formed on the surface of the insulating layer 4 when the curled structure 7 is in the curled state. Thus, the dimming panel as illustrated in this implementation can overcome the problems existing in the prior art and improve stability and effectiveness of electronically controlling of the dimming panel.

In some optional implementations of the present disclosure, a receiving groove is formed on the substrate, and the first transparent electrode layer and the insulating layer have a groove structure formed on the receiving groove, that is, the first transparent electrode layer and the insulating layer covered on the substrate may respectively have a groove structure by opening a receiving groove on the substrate. The first transparent electrode layer and the insulating layer may be uniform in thickness, which may ensure an accurate and stable position of the groove structure, and also facilitate for an attaching design of the layered structure such that installation efficiency can be ensured. The substrate may be selected as a glass substrate or a flexible plastic substrate, etc. which will be not limited thereto in this implementation.

Alternatively, in the other optional implementations, as shown in FIG. 2, the substrate 1 may be further provided with a liner layer 2, on which a receiving groove 21 is formed (as shown in FIG. 3). The first transparent electrode layer 3 and the insulating layer 4 are sequentially disposed on the liner layer 2, and have a groove structure 41 formed on the receiving groove 21. The liner layer 2 is a resin layer, for example, an organic transparent resin material (Over Coat, OC). It should be noted that the receiving groove 21 as shown on the liner layer 2 may be a through groove structure so that the surface of the corresponding substrate is exposed and, furthermore, the first transparent electrode layer 3 in the receiving groove 21 is attached to the substrate, and also may be a non-through groove, so that the first transparent electrode layer 3 is completely attached to the liner layer.

In addition, the groove structure may also be formed by digging a groove on the insulating layer, which is not limited in the implementation of the present disclosure, as long as the groove structure capable of receiving the curled structure that is finally formed on the insulating layer in contact with the curled structure.

In some optional implementations of the present disclosure, the groove structure is presented in an inverted trapezoid, through which design the curled structure can more easily extend upwardly from the two edges of the groove structure and also can more easily climb slope when the curled structure extends and attaches to the insulating layer. Furthermore, the slope of the edge of the groove structure can be adjusted according to requirement for climbing slope of the curled structure, and two corners are provided with radian shape which is more favorable for the attaching design such that the second flexible electrode layer in the curled structure has a better attaching effect. A depth T1 of the groove structure is greater than or equal to a curling height T2 of the curled structure formed after the second flexible electrode layer is curled, that is, the height of the curled structure after curling together as formed relatively perpendicular to the surface of the insulating layer, such that the curled structure in the curled state is completely received within the groove structure without protruding to the insulating layer 4.

Figure 3A:
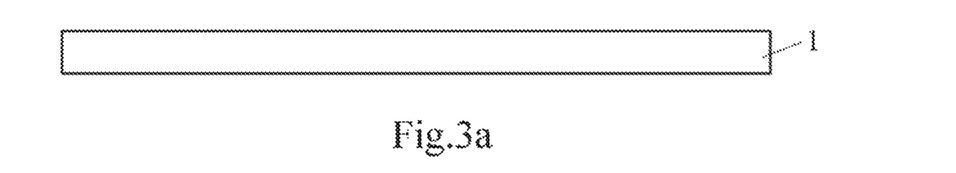
FIGS. 3a-3h are schematic views showing structural changes corresponding to a preparation method for a dimming panel as provided in the present disclosure.
Figures 3B, 3C:
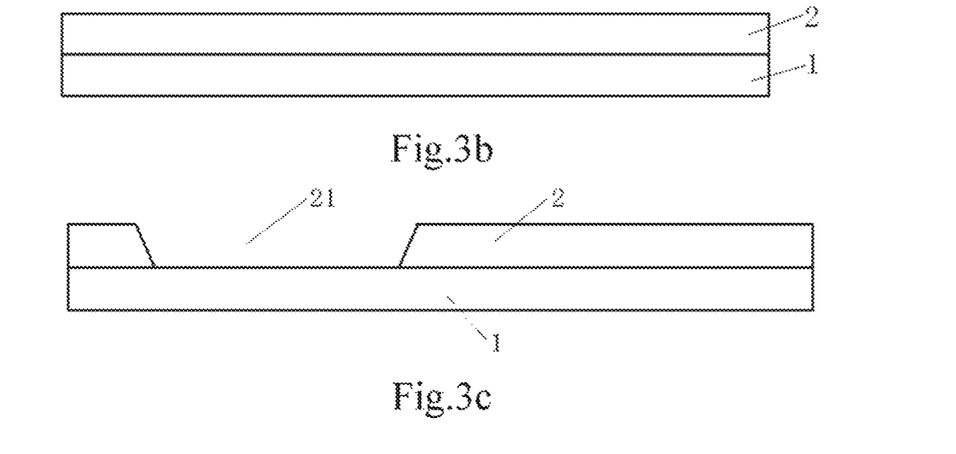
Figure 3D:
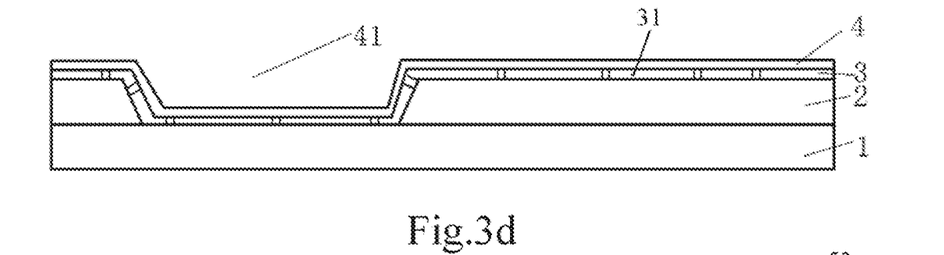
Figure 3E:
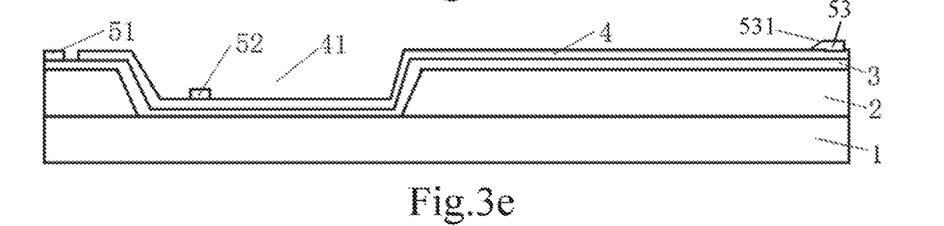
Figure 3F:
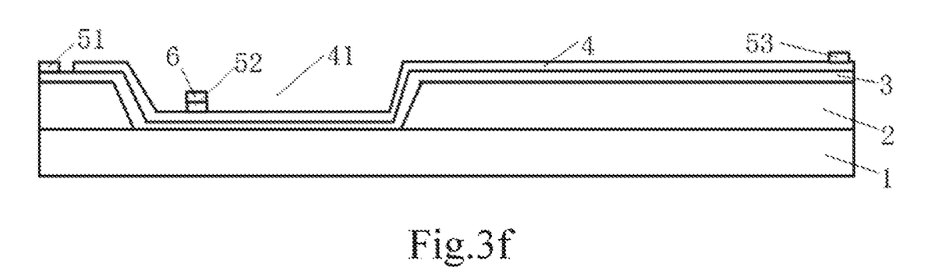
Figure 3G:
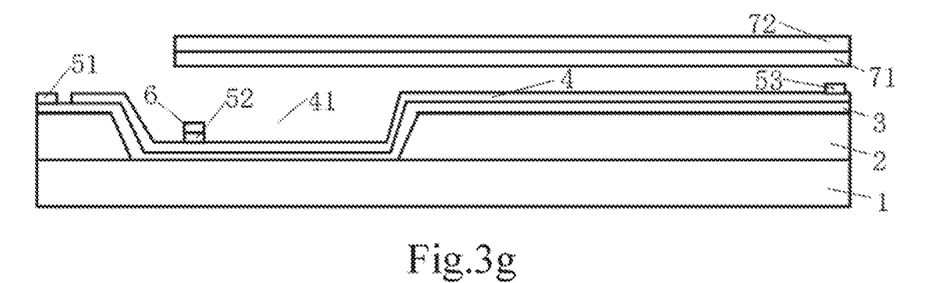

Referring to FIG. 2 and FIG. 3g, for consideration of support and stability of the curled structure, the curled structure 7 further includes a polymer layer 72, where the second flexible electrode layer 71 is arranged to attach to the polymer layer 72, and at least one of the second flexible electrode layer 71 and the polymer layer 72 is preset with an inherent stress of curling, which not only facilitates for formation of the curled structure, but also can bring better optimization for the curled structure based on the function of the polymer layer. For example, the polymer layer, having a better strength, is used such that the curled structure formed by attaching the polymer layer to the second flexible electrode layer has better strength and plays a role of support. As a further example, a polymer layer having better stretchability may be used such that the curled structure formed by attaching the polymer layer to the second flexible electrode layer has a better stretchability, that is, the curled structure as being stretched is more stable, and cannot wrinkle because that the second flexible electrode layer is too soft. The first transparent electrode layer 3 may be a transparent electrode, for example: ITO (indium tin oxide), nano silver, aluminum zinc oxide metal material or made from conductive polymer of polyaniline and poly (3, 4 ethylene dioxythiophene poly (styrenesulfonic acid), for example, PEDOT: PSS (polyethylenedioxythiophene-poly(styrenesulfonate)). The insulating layer 4 may be selected from silicon nitride, silicon oxide, or polymer materials such as polyimide or styrene butane. The second flexible electrode layer 71 may be a flexible electrode of aluminum or silver. The polymer layer 72 made be made from flexible polymeric materials.

Further, the polymer layer 72 is disposed on one side of the second flexible electrode layer 71 away from the first transparent electrode layer 3, such that the second flexible electrode layer 71 may be closer to the first transparent electrode layer 3 to further make an electric field between the two electrode layers stronger, and adsorption force greater, thereby facilitating that the curled structure extends and attaches to the insulating layer.

In addition, many more layer structures may be integrated in the curled structure to achieve more complicated functions. For example, an optical functional layer may also be added to realize optical functions, such as filtering, optical power generation, and the like. In addition, the added functional layers may be an additional layer structure, or formed by directly integrating the corresponding functions into the polymer layer 72 or the second flexible electrode layer 71, which is not limited in this implementation.

In some optional implementations of the present disclosure, a first contact electrode 52 is disposed in the groove structure 41. One end of the second flexible electrode layer 71 is fixedly connected to the insulating layer 4 through the first contact electrode 52. The first contact electrode 52 is used for supplying power for the second flexible electrode layer. On one hand, the curled structure has a fixed joint on one end thereof and forms a certain slope at the fixed joint, which is more advantageous for unfolding of the curled structure at the starting moment. On the other hand, effective power supply to the second flexible electrode layer can be ensured. The first contact electrode 52 is selectively bonded to the second flexible electrode layer 71 by an adhesive 6. The adhesive 6 may be selected from ACF glue or other conductive glue.

Further, a second contact electrode 51 is disposed at one end of the first transparent electrode layer 3 close to the groove structure 41, and the second contact electrode 51 is used for supplying power to the first transparent electrode layer 3, such that a stable and efficient power supply of the first transparent electrode layer 3 may be realized without interfering the second flexible electrode layer 71.

Further, a third contact electrode 53 is disposed at one end of the insulating layer 4 away from the groove structure 41. The third contact electrode 53 is used as a positioning structure when the second flexible electrode layer 71 is unfolded. That is, the second flexible electrode layer 71 is unfolded to the position of the third contact electrode 53, namely, extending until expansion has been completed, while playing a function of a signal feedback. For example, the third contact electrode 53 is provided with an inductive means, where the inductive means can output a feedback signal when the second flexible electrode layer 71 to which the voltage is applied approaches to the third contact electrode 53, to permit a control portion to acknowledge that the second flexible electrode layer 71 has been fully unfolded. In addition, the third contact electrode also can attach to the second flexible electrode such that a better unfolding and fixing function can be achieved.

Specifically, as an example of inputting a reference voltage through the second contact electrode 51 in the first transparent electrode layer 3, the second flexible electrode layer 71 gradually extends along the first transparent electrode layer 3 and covers the first transparent electrode layer 3 based on the adsorption function when the first contact electrode 52 inputs climbing voltage to the second flexible electrode layer 71. One movable end of the second flexible electrode layer 71 is attached to the third contact electrode 53 when the second flexible electrode layer 71 is in a completely unfolded state. The extension may be maintained by strengthening attachment of the third contact electrode 53 to the second flexible electrode layer 71. Here, the dimming panel is opaque based on the absorption or reflection of the second flexible electrode layer 71. If the voltage in the third contact electrode 53 and the second flexible electrode layer 71 is cancelled, the second flexible electrode layer 71 returns to the curled state based on the inherent stress and, at this moment, the dimming panel is transparent. Conversely, the reference voltage may be input to the second flexible electrode layer 71 and the climbing voltage is input to the first transparent electrode layer 3, which will be omitted in this implementation.

In some optional implementations of the present disclosure, a bevel structure 531 is provided on one side of the third contact electrode 53 corresponding to the groove structure 41 (see FIG. 3e). That is, the bevel is arranged at a position where the second flexible electrode layer 71 and the third contact electrodes 53 are in contact with each other, which not only can facilitate maintaining the unfolded state of the curled structure to eliminate curling effect of the edge position, but also can speed up curling efficiency of the curled structure and ensure curling quality.

For example, a terminal structure 710 matched with the third contact electrode 53 is arranged on one end of the second flexible electrode layer 71 corresponding to the third contact electrode 53 (see FIG. 3h), which may allow the second flexible electrode layer 71 and the third contact electrode 53 to have a more stable cooperating relationship. For example, two independent magnetic components may be disposed on the end, and the end of the second flexible electrode layer 71 is connected to the third contact electrode 53 more stably and accurately due to magnetic attraction. Of course, other cooperating structures may also be employed, which will be omitted in this implementation.

It should be noted that the contact electrodes in the above implementations may be composed of a non-transparent and low-resistance metal, such as Mo, Al, Cu, or the like. The first contact electrode 52, the second contact electrode 51, and the third contact electrode 53 may be prepared using the same material or different materials.

On the basis of the above implementations, it is considered that the groove structure 41 from the bottom of the groove to the insulating layer at the edge needs to go through a climbing process from a low position to a high position, so that different driving forces are required. Thus, the present disclosure proposes that the first transparent electrode layer is configured as a structure including a plurality of strip electrodes 31 arranged at intervals. The arrangement direction of the plurality of strip electrodes 31 is the same as the extending direction of the second flexible electrode layer, where the arrangement direction of the strip electrodes 31 is a spacing direction of the different strip electrodes 31. That is, the strip electrodes 31 are arranged substantially along the extending direction of the second flexible electrode layer, and then a plurality of strip electrodes 31 are repeatedly arranged after being separated by a distance to the extending direction. In this regard, extension driving at different stages can be achieved by providing different driving forces to the different strip electrodes 31, and the extension stability and reliability of the curled structure can be ensured. In addition, the strip electrode 31 may also effectively control the extending state of the curled structure by applying a voltage at different times, to improve control precision. For example, the second flexible electrode layer may be extended partially.

The Second Implementation

An implementation of the present disclosure further provides a controlling device, which includes a dimming panel according to the implementation of the present disclosure. The dimming panel can be used in different devices, for example, the controlling device may be selected as glasses, doors and windows, and various planes to be dimmed, etc., and the specific application areas of the dimming panel are not limited in the present disclosure.

Further, the implementation of the present disclosure further provides a controlling system, which includes the dimming panel or the controlling device according to the implementation of the present disclosure, and further includes a power supply for supplying power and a controlling unit for stretching or curling of the second flexible electrode layer. As a result, the controlling unit in the controlling system can realize driving and controlling of the dimming panel or the controlling device, such that light transmitting or shading can be switched.

The Third Implementation

Figure 4:
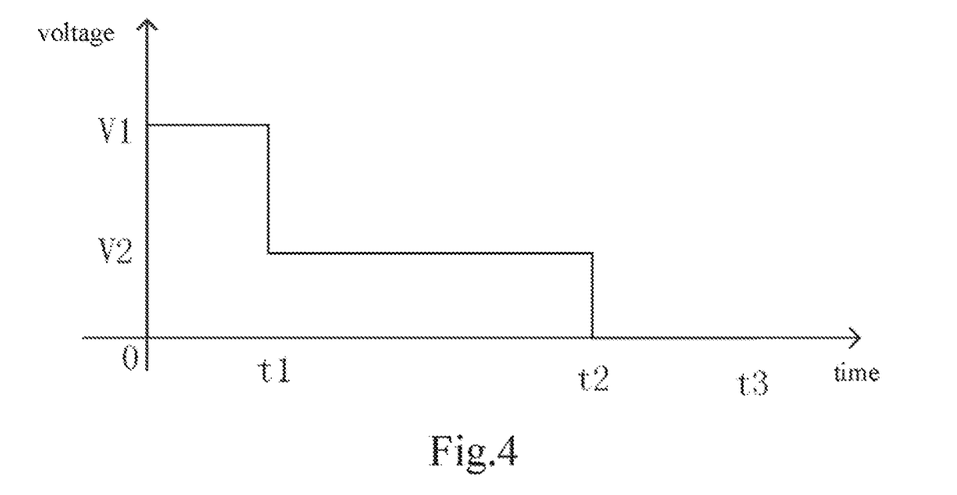
FIG. 4 is a schematic view of a driving voltage in one implementation of a driving method for a dimming panel as provided in the present disclosure.

An implementation of the present disclosure further provides a driving method of the dimming panel. The driving method includes stretching driving and curling driving, where the stretching driving includes:

Referring to FIG. 4, a schematic view of a driving voltage in one implementation of the driving method of the dimming panel as provided in the present disclosure is shown. First, at a first stage (0-t1) in which the second flexible electrode layer is located in the groove structure 41, a preset reference voltage is input to the first transparent electrode layer, and a preset climbing voltage V1 is input to the second flexible electrode layer, and the second flexible electrode layer is driven to extend from the groove structure 41 by an electric field formed by the reference voltage and the climbing voltage. Thus, the climbing of the curled structure is achieved. The reference voltage herein generally is 0V.

Next, at a second stage (t1-t2) in which the second flexible electrode layer is at least partially separated from the groove structure, a preset stretching voltage V2 is input to the second flexible electrode layer. The stretching voltage is used for driving the second flexible electrode layer to be unfolded along a direction closer to the first transparent electrode layer, where the stretching voltage is less than the climbing voltage. In this regard, it is convenient that the curled structure can climb and stretch fast by inputting a relatively higher climbing voltage at the climbing stage. When the second flexible electrode layer is at least partially separated from the groove structure 41, a part of the second flexible electrode layer has been devoiced from the groove structure 41 through stretching.

Alternatively, the voltages input into the two electrode layers may be switched as follows:

At the first stage (0-t1) in which the second flexible electrode layer is located in the groove structure, a preset reference voltage is input to the second flexible electrode layer, and a preset climbing voltage is input to the first transparent electrode layer, where the climbing voltage is used for driving the second flexible electrode layer to stretch out of the groove structure.

At the second stage (t1-t2) in which the second flexible electrode layer at least partially leaves away from the groove structure, the preset stretching voltage is input to the first transparent electrode layer, where the stretching voltage is used for driving the second flexible electrode layer to stretch along a direction close to the first transparent electrode layer, and where the stretching voltage is less than the climbing voltage.

The curling driving includes:

at the stage of curling as desired, cancelling at least one of the voltages in the first transparent electrode layer or the second flexible electrode layer, such that the second flexible electrode layer is re-curled to the groove structure 41 under the action of an inherent stress.

Figure 5:
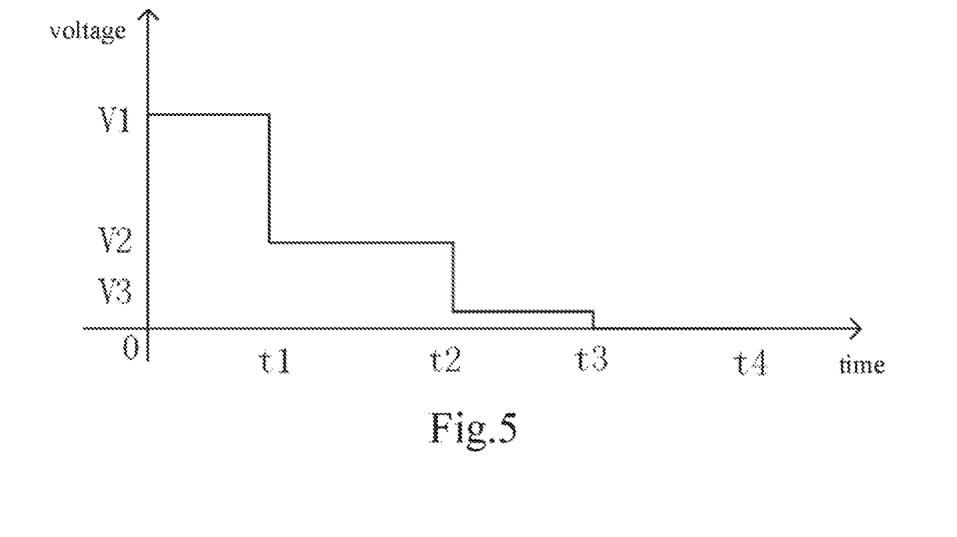
FIG. 5 is a schematic view of a driving voltage in another implementation of a driving method for a dimming panel as provided in the present disclosure.
Figure 6:
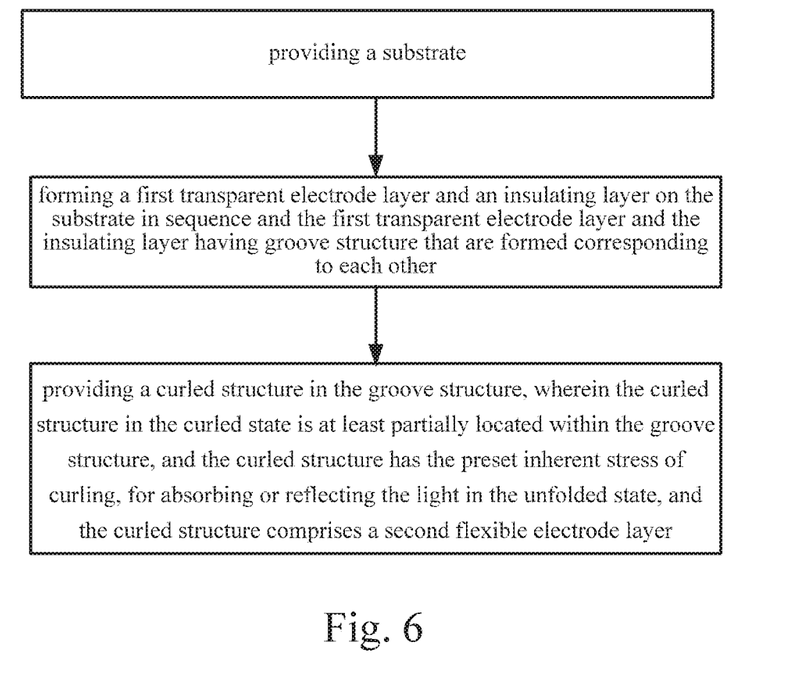
FIG. 6 is a flow chart of preparation method of the dimming panel according to present disclosure.

Referring to FIG. 5, which is a schematic view of a driving voltage in another implementation of the driving method of the dimming panel as provided in the present disclosure. As can be seen from FIG. 5, this implementation is substantially the same as the implementation in FIG. 4, except for a third stage that has been added. Specifically, at the third stage (t2-t3) in which the second flexible electrode layer is fully unfolded, a preset maintaining voltage V3 is input to the second flexible electrode layer or the first transparent electrode layer, where the maintaining voltage is used for driving the second flexible electrode layer to resist against the inherent stress to maintain an unfolded state, and where the maintaining voltage is less than the stretching voltage. In this regard, the curled structure may be maintained in the unfolded state only by means of a lower maintaining voltage V3, which greatly reduces power consumption.

Further, when the spacer strip electrode 31 is used for the first transparent electrode layer, the stretching driving includes: inputting a control voltage to the corresponding strip electrode 31 according to the position where the second flexible electrode layer is stretched or changing magnitude of the control voltage input to the corresponding strip electrode 31 while the control voltage is input to the first transparent electrode layer, where a plurality of strip electrodes 31 arranged separately are independent driving electrodes. The control voltage and the voltage applied to the second flexible electrode layer correspondingly form a reaction force that resists the inherent stress of the second flexible electrode layer. In this regard, stretching driving control can be achieved more accurately by the strip electrodes 31.

More particularly, for example, a plurality of strip electrodes 31 that are independently controlled may be disposed along an extending direction of the second flexible electrode layer. When the second flexible electrode layer is driven to stretch in the extending direction, the control voltages matched with the second flexible electrode layer may be sequentially input to the strip electrode 31 closest to the movable end of the second flexible electrode layer, so that the strip electrode 31 and the second flexible electrode layer form an electric field and drive the second flexible electrode layer to extend, and the voltage of the current strip electrode 31 may be canceled until the movable end of the second flexible electrode layer exceeds the current strip electrode 31, and the control voltage is input to the next strip electrode 31 in the extending direction such that the second flexible electrode layer gradually stretches in the extending direction. Of course, based on the same principle, driving of the second flexible electrode layer can be achieved by sequentially applying different voltages to the strip electrodes 31 in the extending direction, while a maintaining voltage may be input to the strip electrodes 31 in the area that has been covered by the second flexible electrode layer such that the area that has been covered by the second flexible electrode layer has a property of maintaining the stretching. Further, the climbing process of the second flexible electrode layer can also be achieved by inputting a larger voltage.

The Fourth Implementation

An implementation of the present disclosure further provides a preparation method of the dimming panel. Referring to FIGS. 3a-3h and FIG. 6, the preparation method includes:

as shown in FIG. 3a, providing a substrate, on which a receiving groove is formed;

as shown in FIGS. 3b-3c, selectively coating one layer of liner layer 2 on the substrate 1, and then forming a receiving groove 21 on the liner layer 2 by a process of exposure development. The receiving groove 21 is a through groove exposed to the upper surface of the substrate 1. In some other implementations, the receiving groove 21 may be a groove having a groove bottom.

In the case that the liner layer 2 is not provided, the receiving groove that is shown may be directly formed on the substrate 1.

As shown in FIG. 3d, a first transparent electrode layer 3 and an insulating layer 4 are sequentially formed on the liner layer 2 and the upper surface of the exposed substrate 1, and the first transparent electrode layer 3 and the insulating layer 4 have a groove structure 41 formed in the receiving groove 21.

As shown in FIGS. 3e and 3f, a plurality of contact electrodes may be disposed at different positions of the insulating layer 4, respectively. The first contact electrode 52 is disposed in the groove structure 41 as a connection point of the curled structure. The second contact electrode 51 is disposed at an end of the first transparent electrode layer, for supplying power to the first transparent electrode layer. A third contact electrode 53 is disposed at one end of the insulating layer away from the groove structure as a positioning point or a locking point where the curled structure is stretched.

Figure 3H:
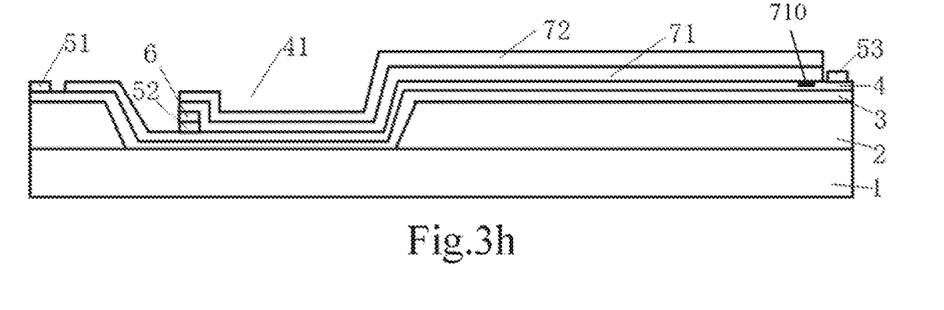

Referring to FIGS. 3g-3h, one end of a curled structure having the second flexible electrode layer is disposed in the groove structure, where the curled structure has a preset inherent stress of curling. As shown in FIG. 3g, the second flexible electrode layer 71 may be attached to the polymer layer 72 in advance, and then the curled structure is bonded to the first contact electrode 52 by an adhesive 6.

Here, the curled structure is in an unfolded state as shown in FIG. 3h, where an electric field is applied between the first transparent electrode layer 3 and the second flexible electrode layer 71, so that the curled structure 7 is expanded due to the electric field force, and takes a stretched plane pose on the insulating layer 4.

The curled structure is in a curled state, as shown in FIG. 2, when the electric field applied between the first transparent electrode layer 3 and the second flexible electrode layer 71 is removed, where an electrostatic force is eliminated and the curled structure 7 is restored to its curled pose due to the inherent stress.

As described above, the present disclosure reduces the height of the protrusion of the electrode mainly by a design of the lower-layer structure, and then performs opening and closing of the polymers by driving the multi-stage voltages. At the same time, a multi-stage driving mode is adopted to effectively cooperate with different processes of the curled structure, such as climbing, stretching, maintaining and retracting. The problem that the protrusions may be damaged by the external force in transmission and occlusion of the light can be solved by means of the polymers and, as a result, the product quality is improved and the power consumption is also reduced.

It should be understood by those ordinary skill in the art that discussion of any of the implementations is merely an example, and is not intended to suggest that the scope of the disclosure (including the claims) is limited to these examples. According to the concept of the present disclosure, the implementations and technical features in the different implementations may also be combined, the steps may be carried out orderly, and there are many other alternations of the various aspects of the present disclosure, which are omitted for the sake of brevity.

In addition, well-known power supply/ground connection to integrated circuit (IC) chips and other components may or may not be shown in the drawings as provided for the purpose of simplicity and discussion, and may not make the present disclosure difficult to understand. Furthermore, the device may be shown in block view in order to avoid obscuring understanding of the present disclosure, and the details of the implementations of the block view are highly dependent on the platform on which the present disclosure is to be implemented (the details should be fully understood by those skilled in the art). In the case that the specific details (e.g., circuits) are set forth to describe the exemplary implementations of the present disclosure, it will be apparent to those skilled in the art that the present disclosure may be carried out without those specific details or alternation of those details. Accordingly, these implementations are considered to be illustrative rather than restrictive.

Although the present disclosure has been described in connection with the specific implementations, many substitutions, modifications and variations of the implementations are apparent to those skilled in the art. For example, other memory architectures (e.g., dynamic RAM (DRAM)) may be used in the implementations as discussed.

All such alternatives, modifications, and variations are intended to be included within the scope of the appended claims. Therefore, any omission, modification, equivalence, improvement, etc., which are made within the spirit and scope of this disclosure, should be included within the scope of the present disclosure.

What is claimed is:

1. A system, comprising:
a dimming panel, comprising:
a substrate;
a first transparent electrode layer disposed on the substrate;
an insulating layer disposed on the first transparent electrode layer, the first transparent electrode layer and the insulating layer having corresponding structures with respect to one another that define a groove structure; and
a curled structure connected to the groove structure, wherein:
the curled structure in a curled state is at least partially located within the groove structure;
the curled structure has a preset inherent stress for curling to absorb or reflect light in an unfolded state;
the curled structure comprises a second flexible electrode layer; and
a depth of the groove structure is greater than or equal to a curling height of the curled structure in a curled state.

2. The system according to claim 1, wherein a receiving groove is formed on the substrate, and the groove structure is disposed within the receiving groove.

3. The system according to claim 2, wherein a liner layer is disposed on the substrate, and the receiving groove is formed on the liner layer, the first transparent electrode layer and the insulating layer are sequentially disposed on the liner layer, and the groove structure is disposed within the receiving groove.

4. The system according to claim 1, wherein the groove structure is an inverted trapezoid.

5. The system according to claim 1, wherein:
a first contact electrode is disposed in the groove structure;
one end of the second flexible electrode layer is fixedly connected to the insulating layer through the first contact electrode; and
the first contact electrode is configured to supply power for the second flexible electrode layer.

6. The system according to claim 1, wherein:
a second contact electrode is disposed on one end of the first transparent electrode layer close to the groove structure; and
the second contact electrode is configured to supply power for the first transparent electrode layer.

7. The system according to claim 1, wherein:
a third contact electrode is disposed on one end of the insulating layer away from the groove structure; and
the third contact electrode is used as a positioning structure for the second flexible electrode layer when being unfolded.

8. The system according to claim 7, wherein a bevel structure is disposed on one side of the third contact electrode corresponding to the groove structure.

9. The system according to claim 7, wherein a terminal structure matched with the third contact electrode is disposed on one end of the second flexible electrode layer corresponding to the third contact electrode.

10. The system according to claim 1, wherein:
the curled structure further comprises a polymer layer;
the second flexible electrode layer is arranged to attach to the polymer layer; and
at least one of the second flexible electrode layer and the polymer layer has a preset inherent stress for curling.

11. The system according to claim 10, wherein the polymer layer is disposed on one side of the second flexible electrode layer away from the first transparent electrode layer.

12. The system according to claim 1, wherein:
the first transparent electrode layer comprises a plurality of strip electrodes that are arranged separately; and
an arrangement direction of the plurality of strip electrodes is the same as a stretching direction of the second flexibility electrode layer.

13. The system according to claim 1, further comprising a controlling device, wherein the controlling device comprises the dimming panel.

14. The system of claim 1, further comprising a controlling system, wherein:
the controlling system comprises the dimming panel;
a power supply for supplying power; and
a control unit for controlling stretching or curling of the second flexible electrode layer.

15. A driving method of the dimming panel of the system according to claim 1, wherein the driving method comprises stretching driving and curling driving;
the stretching driving comprises:
at a first stage in which the second flexible electrode layer is located within the groove structure, a preset reference voltage is input to the first transparent electrode layer, and a preset climbing voltage is input to the second flexible electrode layer, and the climbing voltage is configured to drive the second flexible electrode layer to stretch out of the groove structure; and
at a second stage in which the second flexible electrode layer is at least partially separated from the groove structure, a preset stretching voltage is input to the second flexible electrode layer, and the stretching voltage is configured to drive the second flexible electrode layer to stretch in a direction close to the first transparent electrode layer; wherein the stretching voltage is less than the climbing voltage; or
at the first stage in which the second flexible electrode layer is located within the groove structure, a preset reference voltage is input to the second flexible electrode layer, and a preset climbing voltage is input to the first transparent electrode layer, and the climbing voltage is configured to drive the second flexible electrode layer to stretch out of the groove structure; and
at the second stage in which the second flexible electrode layer is at least partially separated from the groove structure, a preset stretching voltage is input to the first transparent electrode layer, and the stretching voltage is configured to drive the second flexible electrode layer to stretch in a direction close to the first transparent electrode layer; wherein the stretching voltage is less than the climbing voltage; and
the curling driving comprises:
cancelling voltage of at least one of the first transparent electrode layer and the second flexible electrode layer such that the second flexible electrode layer is re-curled into the groove structure under the action of inherent stress.

16. The driving method according to claim 15, further comprising:

at a third stage in which the second flexible electrode layer is fully stretched, a preset maintaining voltage is input to the second flexible electrode layer or the first transparent electrode layer; and the maintaining voltage is configured to drive the second flexible electrode layer to resist against the inherent stress to maintain the unfolded state, wherein the maintaining voltage is less than the stretching voltage.

17. The system according to claim 12, wherein:
a control voltage is input to the corresponding strip electrode according to a position where the second flexible electrode layer is stretched or magnitude of the control voltage input to the corresponding strip electrode is changed during the control voltage is input to the first transparent electrode layer;
the plurality of strip electrodes separately arranged are separate driving electrodes; and
the control voltage and a voltage applied in the second flexible electrode layer correspondingly form a reaction force against the inherent stress of the second flexible electrode layer.

18. A preparation method of a dimming panel, comprising:
providing a substrate;
forming a first transparent electrode layer and an insulating layer on the substrate in sequence and the first transparent electrode layer and the insulating layer each having a groove structure that is formed corresponding to each other; and
providing a curled structure in the groove structure, wherein:
the curled structure in the curled state is at least partially located within the groove structure; the curled structure has the preset inherent stress of curling for absorbing or reflecting light in the unfolded state;
the curled structure comprises a second flexible electrode layer; and
a depth of the groove structure is greater than or equal to a curling height of the curled structure in a curled state.

19. A method, comprising providing the dimming panel of the system of claim 1.

* * * * *